US012783074B2

(12) United States Patent
Kitada

(10) Patent No.: US 12,783,074 B2
(45) Date of Patent: Nov. 3, 2026

(54) SENSOR

(71) Applicant: Murata Manufacturing Co., Ltd., Nagaokakyo (JP)

(72) Inventor: Hiroaki Kitada, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 18/785,382

(22) Filed: Jul. 26, 2024

(65) Prior Publication Data

US 2024/0385710 A1 Nov. 21, 2024

Related U.S. Application Data

(63) Continuation of application No. PCT/JP2023/004160, filed on Feb. 8, 2023.

(30) Foreign Application Priority Data

Feb. 10, 2022 (JP) ................................ 2022-019247

(51) Int. Cl.
*G06F 3/041* (2006.01)

(52) U.S. Cl.
CPC .................................. *G06F 3/0414* (2013.01)

(58) Field of Classification Search
CPC .......... G06F 3/0414; G06F 3/01; G06F 3/041; G01L 1/16; H10N 30/302; H10N 30/30
See application file for complete search history.

(56) References Cited

U.S. PATENT DOCUMENTS

| | | | | |
|---|---|---|---|---|
| 10,309,844 | B2 | 6/2019 | Kawamura | |
| 10,381,546 | B2 | 8/2019 | Kou et al. | |
| 10,503,291 | B2 | 12/2019 | Kihara | |
| 10,788,912 | B2 | 9/2020 | Kuo et al. | |
| 2015/0292963 | A1* | 10/2015 | Kawamura | G01L 1/16 345/87 |
| 2016/0169753 | A1* | 6/2016 | Kawamura | G01L 1/16 73/774 |
| 2017/0033276 | A1 | 2/2017 | Kou et al. | |
| 2017/0177106 | A1 | 6/2017 | Kihara | |
| 2019/0066430 | A1* | 2/2019 | Kihara | G06F 3/041 |
| 2019/0214544 | A1* | 7/2019 | Mori | G06F 3/0414 |

(Continued)

FOREIGN PATENT DOCUMENTS

| | | |
|---|---|---|
| CN | 211719617 U | 10/2020 |
| JP | H09-119860 A | 5/1997 |

(Continued)

OTHER PUBLICATIONS

International Search Report received for PCT Patent Application No. PCT/JP2023/004160, mailed on Apr. 18, 2023, 2 pages (English Translation Only).

*Primary Examiner* — Temesghen Ghebretinsae
*Assistant Examiner* — Ivelisse Martinez Quiles
(74) *Attorney, Agent, or Firm* — ArentFox Schiff LLP

(57) ABSTRACT

A sensor that includes: a piezoelectric film including an upper principal surface and a lower principal surface aligned in an up-down direction; a lower electrode on the lower principal surface of the piezoelectric film; an electrode member including an upper electrode; and a bonding member that fixes the electrode member to the upper principal surface of the piezoelectric film. A Young's modulus of the bonding member is 0 MPa to 10 MPa.

10 Claims, 9 Drawing Sheets

(56) References Cited

U.S. PATENT DOCUMENTS

| | | | | |
|---|---|---|---|---|
| 2020/0050307 | A1* | 2/2020 | Kuo | G06V 40/1306 |
| 2021/0311582 | A1* | 10/2021 | Mugiraneza | G06F 3/0414 |
| 2022/0365630 | A1* | 11/2022 | Ando | G01L 9/08 |

FOREIGN PATENT DOCUMENTS

| | | | |
|---|---|---|---|
| JP | 2000-114912 | A | 4/2000 |
| JP | 2000-275280 | A | 10/2000 |
| JP | 2009-025065 | A | 2/2009 |
| JP | 2017-098383 | A | 6/2017 |
| JP | 2020-027596 | A | 2/2020 |
| WO | 2015/041198 | A1 | 3/2015 |
| WO | 2015/080109 | A1 | 6/2015 |
| WO | 2015/083678 | A1 | 6/2015 |
| WO | 2015/129829 | A1 | 9/2015 |
| WO | 2015/146367 | A1 | 10/2015 |
| WO | 2016/035682 | A1 | 3/2016 |
| WO | 2018/221288 | A1 | 12/2018 |
| WO | 2019/058444 | A1 | 3/2019 |

* cited by examiner

SENSOR

CROSS REFERENCE TO RELATED APPLICATIONS

The present application is a continuation of International application No. PCT/JP2023/004160, filed Feb. 8, 2023, which claims priority to Japanese Patent Application No. 2022-019247, filed Feb. 10, 2022, the entire contents of each of which are incorporated herein by reference.

TECHNICAL FIELD

The present disclosure relates to a sensor that detects a pressing force.

BACKGROUND ART

As an disclosure related to a conventional electronic device, for example, a pressing sensor described in Patent Document 1 is known. The pressing sensor includes an operation surface, a plate-shaped member, and a piezoelectric film. The user performs a pressing operation by touching the operation surface. The plate-shaped member is bent by the pressing operation. The piezoelectric film is bonded to the plate-shaped member to be bent together with the plate-shaped member. As a result, a pressing force is detected by an output of the piezoelectric film.

Patent Document 1: WO 2015/083678 A

SUMMARY OF THE DISCLOSURE

By the way, in the pressing sensor described in Patent Document 1, there is a demand for accurately detecting the magnitude of the force by which the user presses the operation surface.

Therefore, an object of the present disclosure is to provide an electronic device capable of accurately detecting the magnitude of the force by which the user presses an operation panel.

A sensor according to an embodiment of the present disclosure includes: a piezoelectric film including an upper principal surface and a lower principal surface aligned in an up-down direction; a lower electrode on the lower principal surface of the piezoelectric film; an electrode member including an upper electrode; and a bonding member that fixes the electrode member to the upper principal surface of the piezoelectric film, in which the bonding member has a Young's modulus of 0 MPa to 10 MPa.

According to the sensor of the present disclosure, a magnitude of a force by which a user presses an operation panel can be accurately detected.

DESCRIPTION OF THE PREFERRED EMBODIMENTS

Embodiment

Figure 1:
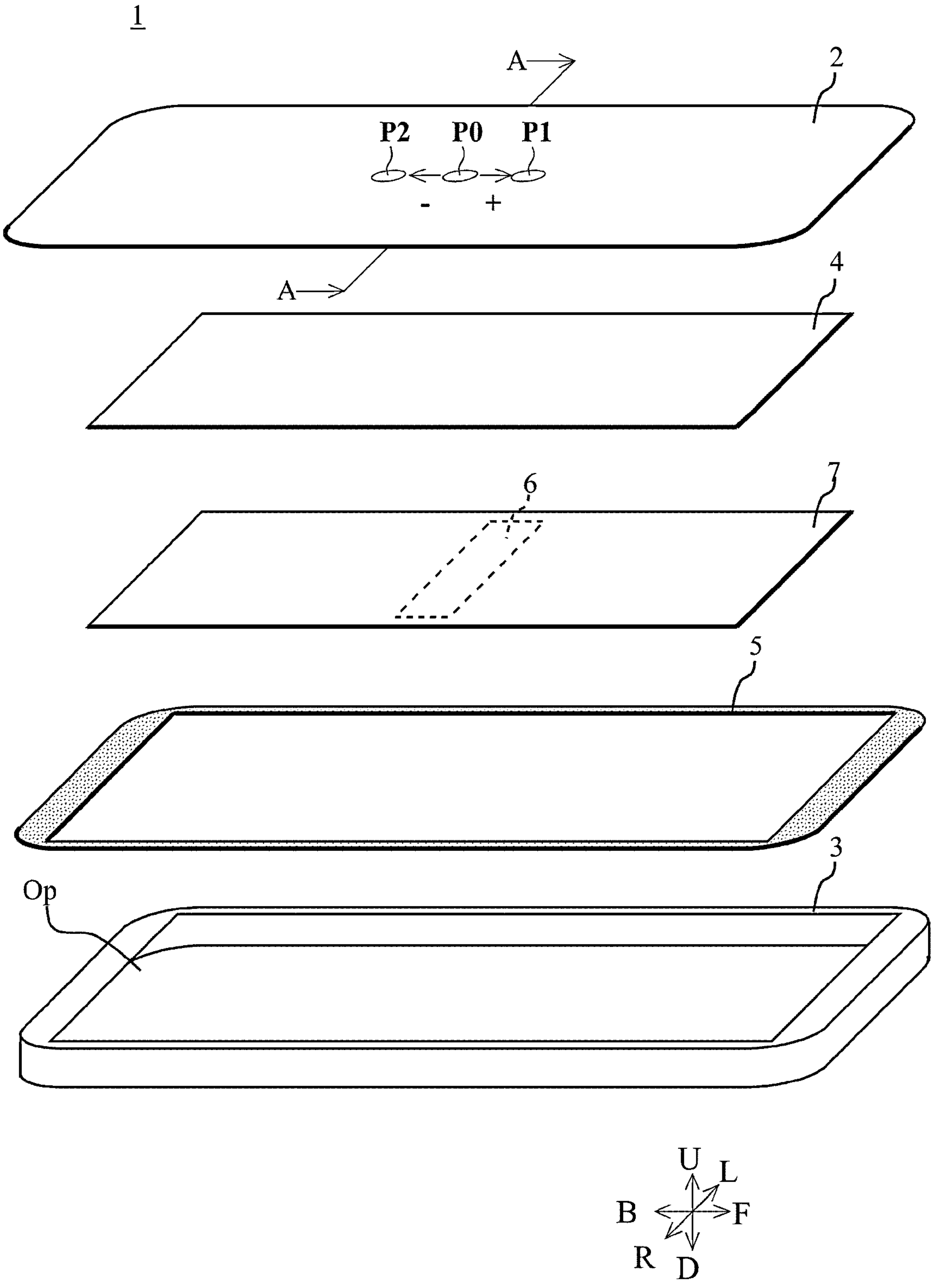
FIG. 1 is an exploded perspective view of an electronic device 1.
Figure 2:
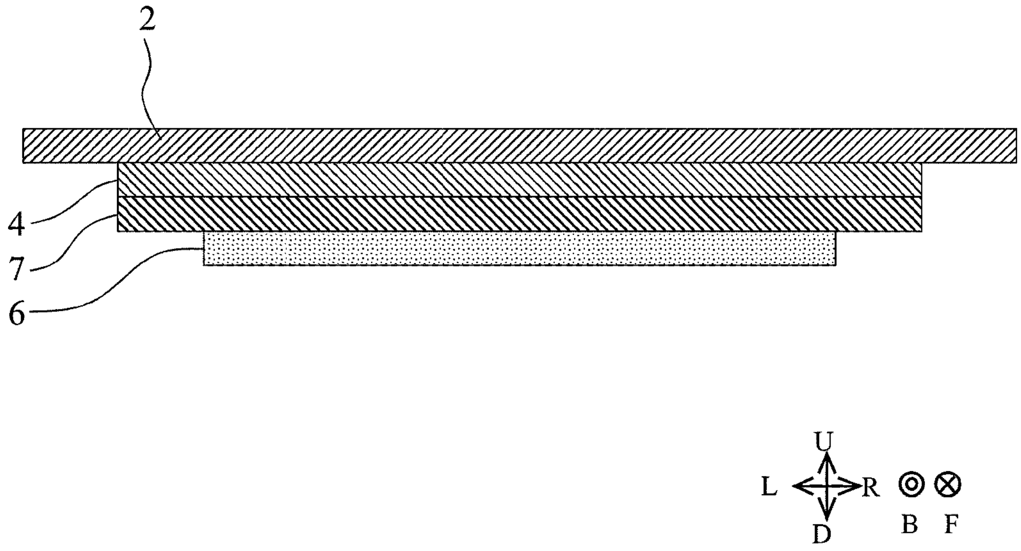
FIG. 2 is a sectional view of the electronic device 1 taken along line A-A.
Figure 3:
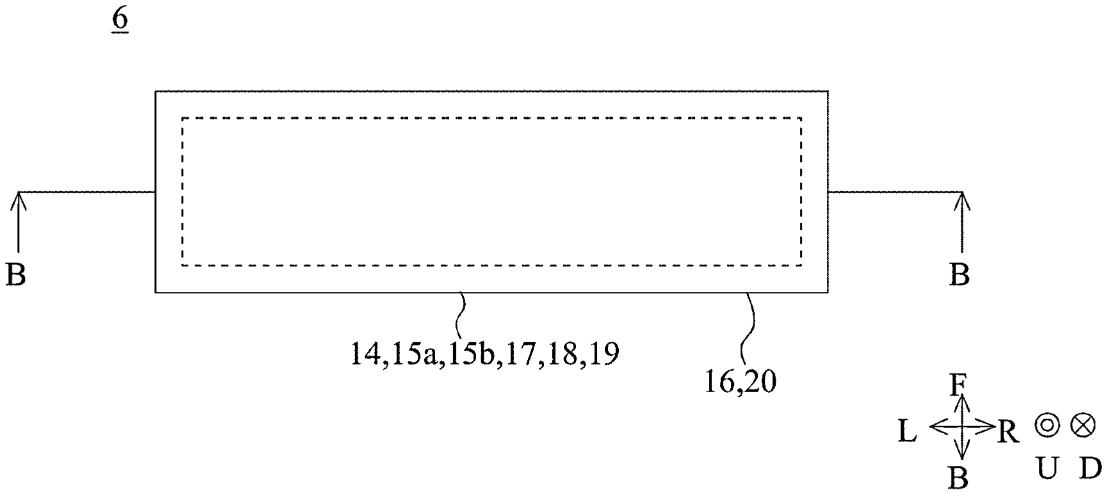
FIG. 3 is a bottom view and a sectional view of a sensor 6.
Figure 3:
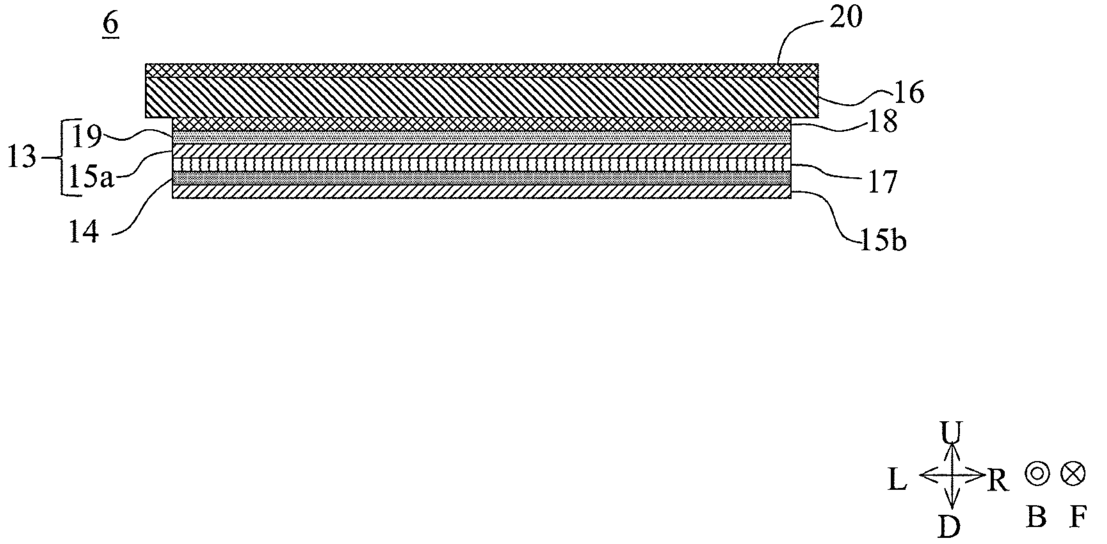

Hereinafter, a configuration of an electronic device 1 including a sensor 6 according to an embodiment of the present disclosure will be described with reference to the drawings. FIG. 1 is an exploded perspective view of the electronic device 1. FIG. 2 is a sectional view of the electronic device 1 taken along line A-A. FIG. 3 is a bottom view and a sectional view of the sensor 6.

Furthermore, in the present specification, directions are defined as described below. In the electronic device 1, a direction in which an upper principal surface and a lower principal surface of an operation panel 2 are aligned is defined as an up-down direction. Furthermore, when viewed in the up-down direction, a direction in which a long side of the operation panel 2 of the electronic device 1 extends is defined as a front-back direction. When viewed in the up-down direction, a direction in which a short side of the operation panel 2 of the electronic device 1 extends is defined as a left-right direction. The up-down direction, the left-right direction, and the front-back direction are orthogonal to each other. Note that the definition of the directions in the present specification is an example. Therefore, the direction at the time of actual use of the electronic device 1 does not need to coincide with the direction in the present specification. Furthermore, the up-down direction may be reversed in FIG. 1. In FIG. 1, the left-right direction may be reversed. The front-back direction may be reversed in FIG. 1.

The electronic device 1 is a portable electronic terminal such as a smartphone or a tablet computer. As illustrated in FIGS. 1 and 2, the electronic device 1 includes the operation panel 2, a housing 3, a display panel 4, a bonding member 5, the sensor 6, and a plate-shaped member 7.

The operation panel 2 includes an upper principal surface and a lower principal surface aligned in the up-down direction. The operation panel 2 has a rectangular shape having two long sides extending in the front-back direction and two short sides extending in the left-right direction when viewed in the up-down direction. A part of a user's body or an operation member comes into contact with the upper principal surface of the operation panel 2. The operation panel 2 is a transparent plate. The operation panel 2 is, for example, a glass plate.

The display panel 4 includes an upper principal surface and a lower principal surface aligned in the up-down direction. The display panel 4 has a rectangular shape having two long sides extending in the front-back direction and two short sides extending in the left-right direction when viewed in the up-down direction. The display panel 4 is fixed to the lower principal surface of the operation panel 2. The display panel 4 is fixed to the operation panel 2 with a bonding adhesive, a double-sided tape, or the like. The entire display panel 4 overlaps the operation panel 2 when viewed in the up-down direction. Therefore, the display panel 4 does not protrude from an outer edge of the operation panel 2 when viewed in the up-down direction. The display panel 4 is, for example, an organic EL display or a liquid crystal display. Furthermore, the display panel 4 may include a touch panel for detecting a position where the user touches the operation panel 2. However, the touch panel may be included in the operation panel 2.

The plate-shaped member 7 includes an upper principal surface and a lower principal surface aligned in the up-down direction. The plate-shaped member 7 has a rectangular shape having two long sides extending in the front-back direction and two short sides extending in the left-right direction when viewed in the up-down direction. The plate-shaped member 7 is fixed to the lower principal surface of the display panel 4. The plate-shaped member 7 is fixed to the display panel 4 with a bonding adhesive, a double-sided tape, or the like. The entire plate-shaped member 7 overlaps the display panel 4 when viewed in the up-down direction. Therefore, the plate-shaped member 7 does not protrude from an outer edge of the display panel 4 when viewed in the up-down direction. The rigidity of the plate-shaped member 7 is higher than the rigidity of the sensor 6 described later. The material of such a plate-shaped member 7 is, for example, metal such as stainless used steel (SUS). However, the material of the plate-shaped member 7 may be a material other than metal. The material other than the metal is, for example, a resin.

The housing 3 is located below the operation panel 2. The housing 3 is a box. The housing 3 has a rectangular shape when viewed in the up-down direction. A long side of the housing 3 extends in the front-back direction. A short side of the housing 3 extends in the left-right direction. An outer edge of the housing 3 viewed in the up-down direction coincides with the outer edge of the operation panel 2 viewed in the up-down direction. However, an upper face of the housing 3 is open. An opening Op of the housing 3 has a rectangular shape when viewed in the up-down direction.

The bonding member 5 fixes a part of the lower principal surface of the operation panel 2 to the housing 3. More specifically, the bonding member 5 fixes a periphery of the opening Op of the housing 3 and a vicinity of the outer edge of the operation panel 2. Thus, the bonding member 5 has a rectangular frame shape surrounding the display panel 4 when viewed in the up-down direction. Therefore, the bonding member 5 does not overlap the display panel 4 when viewed in the up-down direction. The bonding member 5 as described above has waterproofness.

The sensor 6 detects deformation of the operation panel 2. As illustrated in FIG. 1, the sensor 6 is fixed to the lower principal surface of the plate-shaped member 7. More specifically, the sensor 6 has a rectangular shape when viewed in the up-down direction. The sensor 6 has a longitudinal direction extending in the left-right direction. The sensor 6 is located at a center of the plate-shaped member 7 in the front-back direction as viewed in the up-down direction.

When the user presses the operation panel 2 to bend the operation panel 2 downward, the display panel 4 and the plate-shaped member 7 also bend downward. Then, the sensor 6 bends downward together with the plate-shaped member 7. As a result, the sensor 6 outputs a detection signal according to deformation generated on the operation panel 2 when the user presses the operation panel 2. Hereinafter, details of the sensor 6 will be described with reference to FIG. 3.

The sensor 6 includes an electrode member 13, a piezoelectric film 14, a lower electrode **15*b*, a substrate 16, a bonding member 17, and bonding layers 18 and 20. The piezoelectric film 14 has a sheet shape. Therefore, the piezoelectric film 14 includes an upper principal surface and a lower principal surface aligned in the up-down direction. A length of the piezoelectric film 14 in the left-right direction is longer than a length of the piezoelectric film 14 in the front-back direction. In the present embodiment, the piezoelectric film 14 has a rectangular shape having long sides extending in the left-right direction when viewed in the up-down direction. The piezoelectric film 14 generates a charge according to a deformation amount of the piezoelectric film 14. In the present embodiment, the piezoelectric film 14 is a PLA film. Hereinafter, the piezoelectric film 14** will be described in more detail.

The piezoelectric film 14 has a characteristic in which a polarity of the charge generated when the piezoelectric film 14 is stretched in the left-right direction is opposite to a polarity of the charge generated when the piezoelectric film 14 is stretched in the front-back direction. Specifically, the piezoelectric film 14 is a film formed of a chiral polymer. The chiral polymer is, for example, polylactic acid (PLA), particularly poly-L-lactic acid (PLLA). A main chain of the PLLA made of a chiral polymer has a helical structure. The PLLA has piezoelectricity in which molecules are oriented when uniaxial stretching is performed. The piezoelectric film 14 has a piezoelectric constant of d14. A uniaxial stretching direction (orientation direction) of the piezoelectric film 14 forms an angle of 45 degrees with respect to each of the front-back direction and the left-right direction. This angle of 45 degrees includes, for example, angles ranging from 45 degrees plus 10 degrees to 45 degrees minus 10 degrees. As a result, the piezoelectric film 14 generates a charge when the piezoelectric film 14 is stretched in the left-right direction or stretched in the front-back direction. A polarity of the charge generated by the piezoelectric film 14 when the piezoelectric film 14 is stretched in the left-right direction is different from a polarity of the charge generated by the piezoelectric film 14 when the piezoelectric film 14 is stretched in the front-back direction. The piezoelectric film 14 generates a positive charge when stretched in the left-right direction, for example. The piezoelectric film 14 generates a negative charge when stretched in the front-back direction, for example. A magnitude of the charge depends on an amount of deformation of the piezoelectric film 14 due to stretching or compression. More precisely, the magnitude of the charge is proportional to a differential value of a deformation amount of the piezoelectric film 14 due to stretching or compression.

The piezoelectric film 14 generates a charge mainly by stretching and contracting in the left-right direction. Therefore, for example, a length of the sensor 6 in the front-back direction (lateral direction) is 10 mm or less, and a ratio (aspect ratio) of a length of the sensor 6 in the left-right direction (longitudinal direction) to the length of the sensor 6 in the front-back direction (lateral direction) is 3 to 10.

The lower electrode **15*b* is a ground electrode. The lower electrode 15*b* is connected to a ground potential. The lower electrode 15*b* is provided on the lower principal surface of the piezoelectric film 14. The lower electrode 15*b* covers the entire lower principal surface of the piezoelectric film 14. The lower electrode 15*b* includes an adhesive layer (not illustrated). Then, the adhesive layer fixes the lower electrode 15***b* to the lower principal surface of the piezoelectric film 14.

The electrode member 13 is located on the piezoelectric film 14. The electrode member 13 includes an upper electrode 15*a* and a flexible printed circuit board 19. The flexible printed circuit board 19 is a circuit board having flexibility. The flexible printed circuit board 19 includes an upper principal surface and a lower principal surface aligned in the up-down direction. The flexible printed circuit board 19 includes a signal line, a ground line, and a plurality of insulator layers. The plurality of insulator layers are stacked in the up-down direction. The signal line and the ground line are conductor layers provided in the insulator layers. The signal line is electrically connected to the upper electrode 15*a*. A detection signal of the upper electrode 15*a* is transmitted to the signal line. The ground line is electrically connected to the lower electrode 15*b*. The ground line is connected to the ground potential.

The upper electrode 15*a* is a signal electrode. A detection signal is output from the upper electrode 15*a*. In the present embodiment, the upper electrode 15*a* is provided on the lower principal surface of the flexible printed circuit board 19. That is, the upper electrode 15*a* is a conductor layer provided on a lower principal surface of a lowermost insulator layer among the plurality of insulator layers of the flexible printed circuit board 19.

The bonding member 17 is located between the upper electrode 15*a* and the piezoelectric film 14. The bonding member 17 fixes the upper electrode 15*a* to the upper principal surface of the piezoelectric film 14. The material of the bonding member 17 is a thermoplastic resin. The material of the bonding member 17 is, for example, polyester, polyurethane, or polyolefin.

The substrate 16 is provided on the electrode member 13. The substrate 16 is deformed together with the piezoelectric film 14 by holding the piezoelectric film 14, the upper electrode 15*a*, and the lower electrode 15*b*. The substrate 16 has a sheet shape. The substrate 16 includes an upper principal surface and a lower principal surface. A length of the substrate 16 in the left-right direction is longer than a length of the substrate 16 in the front-back direction. In the present embodiment, the substrate 16 has a rectangular shape having long sides extending in the left-right direction when viewed in the up-down direction. The long side of the substrate 16 is longer than the long side of the piezoelectric film 14, a long side of the upper electrode 15*a*, and a long side of the lower electrode 15*b*. A short side of the substrate 16 is longer than a short side of the piezoelectric film 14, a short side of the upper electrode 15*a*, and a short side of the lower electrode 15*b*. The piezoelectric film 14, the upper electrode 15*a*, and the lower electrode 15*b* are disposed in a region surrounded by an outer edge of the substrate 16 when viewed in the up-down direction. The material of the substrate 16 is, for example, polyurethane or PET.

The bonding layer 18 fixes the piezoelectric film 14, the upper electrode 15*a*, the lower electrode 15*b*, and the flexible printed circuit board 19 to the substrate 16. More specifically, the bonding layer 18 is provided on the lower principal surface of the substrate 16. The bonding layer 18 covers a part of the lower principal surface of the substrate 16. Furthermore, the bonding layer 18 covers the entire upper principal surface of the flexible printed circuit board 19. An outer edge of the bonding layer 18 is surrounded by the outer edge of the substrate 16 when viewed in the up-down direction. The bonding layer 18 bonds the flexible printed circuit board 19 and the substrate 16. As a result, the deformation of the substrate 16 is transmitted to the piezoelectric film 14 through the bonding layer 18 and the electrode member 13. The material of the bonding layer 18 is, for example, a double-sided tape, a thermosetting bonding adhesive, or a thermoplastic bonding adhesive.

The bonding layer 20 is provided on the upper principal surface of the substrate 16. The bonding layer 20 fixes the substrate 16 to the lower principal surface of the plate-shaped member 7. The material of the bonding layer 20 is, for example, a double-sided tape, a thermosetting bonding adhesive, or a thermoplastic bonding adhesive.

Figure 4:
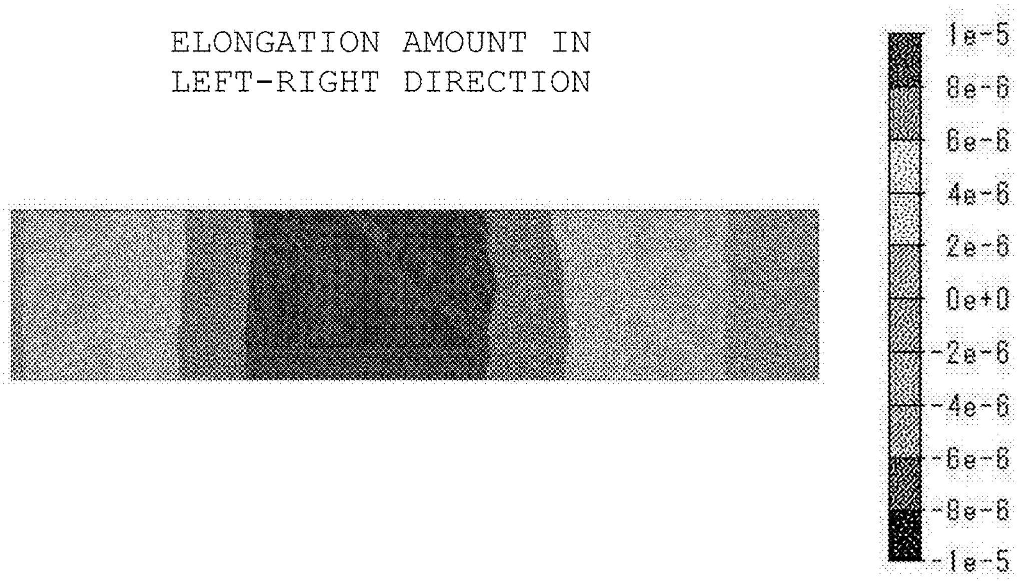
FIG. 4 is a diagram illustrating an elongation amount in a left-right direction and an elongation amount in a front-back direction of a piezoelectric film 14 of an electronic device according to a comparative example.
Figure 4:
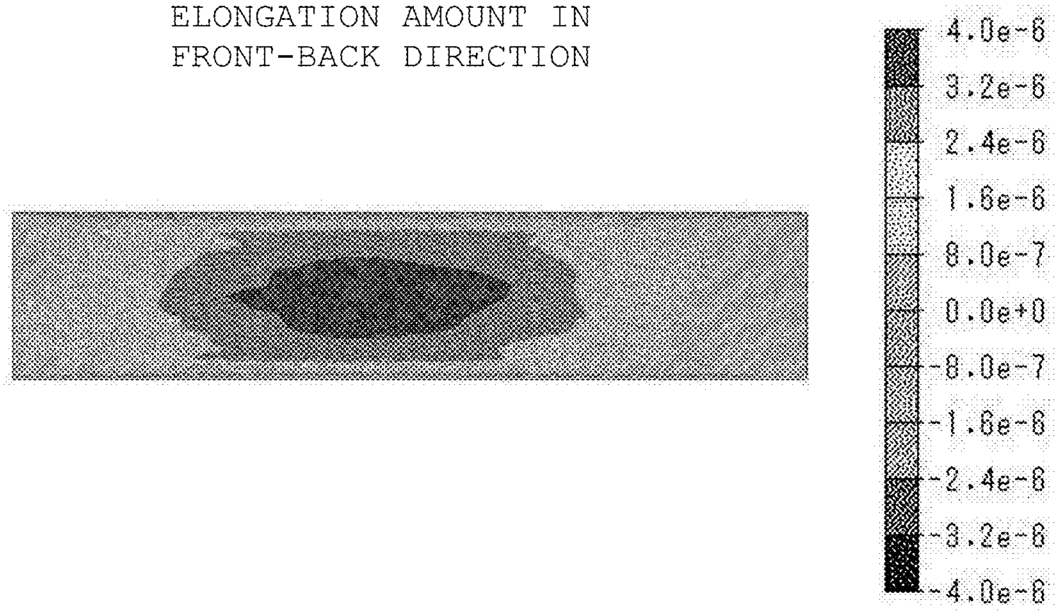
Figure 5:
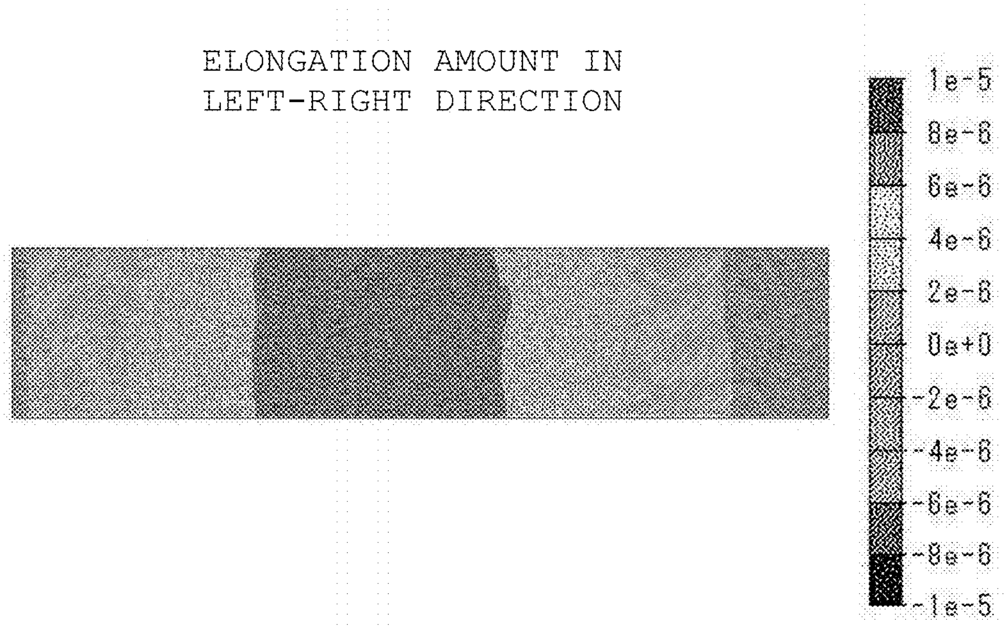
FIG. 5 is a diagram illustrating an elongation amount in the left-right direction and an elongation amount in the front-back direction of the piezoelectric film 14 of the electronic device according to the comparative example.
Figure 5:
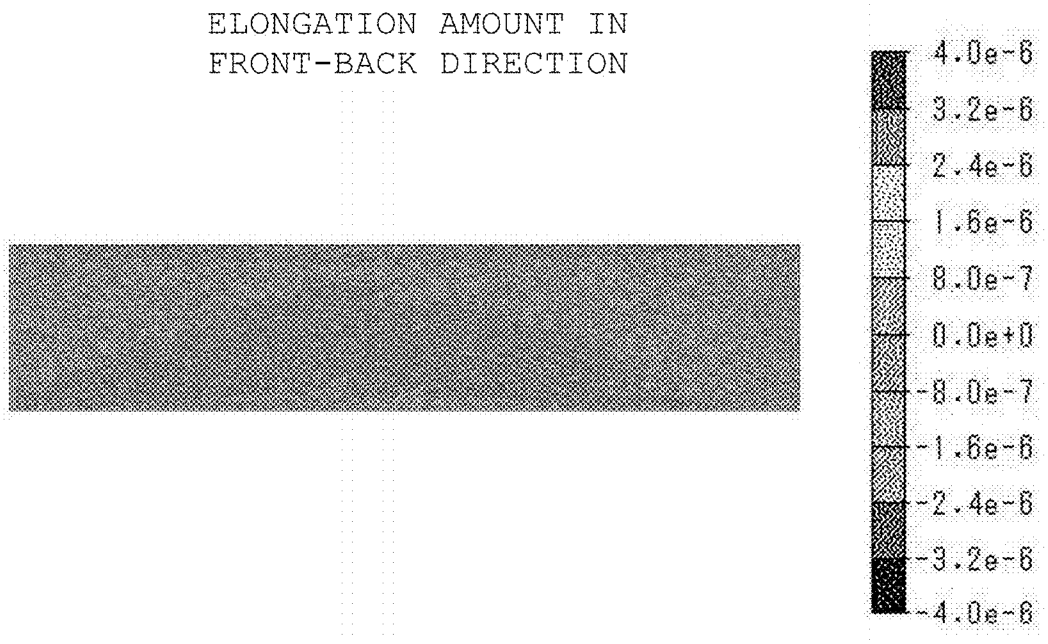
Figure 6:
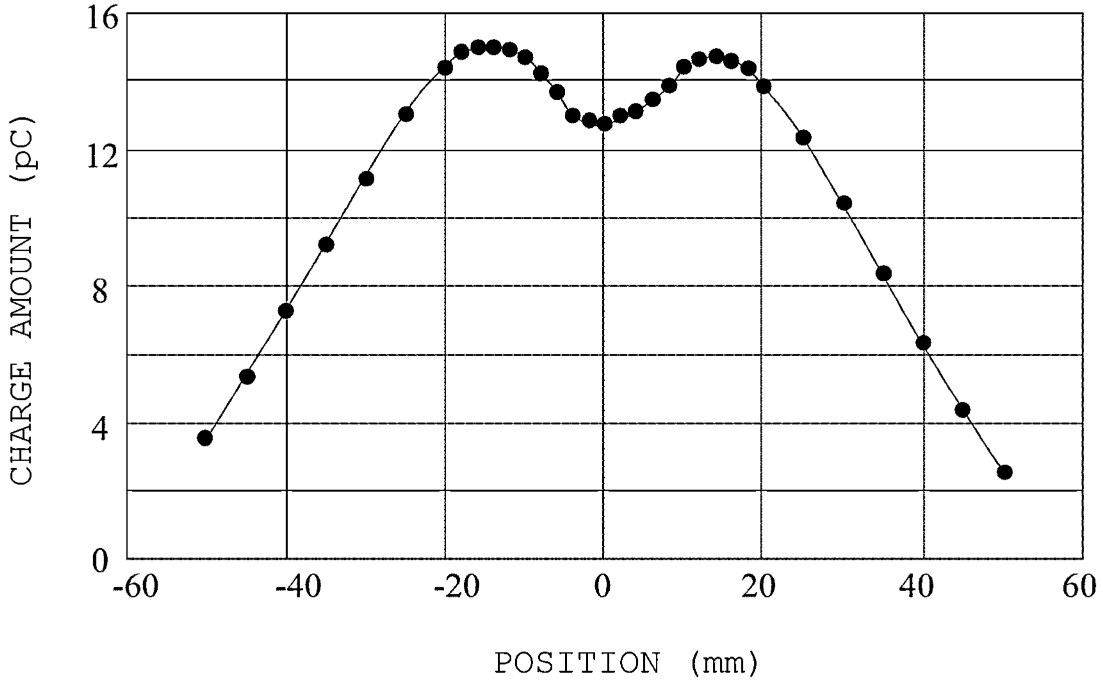
FIG. 6 is a graph illustrating a relationship between a pressing position of a user and an amount of charge generated by the piezoelectric film 14 in the electronic device according to the comparative example.

Incidentally, the electronic device 1 has a structure capable of accurately detecting a magnitude of a force by which the user presses the operation panel 2. This structure will be described below. FIGS. 4 and 5 are diagrams illustrating an elongation amount in the left-right direction and an elongation amount in the front-back direction of a sensor 6 of an electronic device according to a comparative example. In FIG. 4, the user presses a position P0 in FIG. 1 downward. In FIG. 5, the user presses a position P1 or a position P2 in FIG. 1 downward. FIG. 6 is a graph illustrating a relationship between a pressing position of the user and a charge amount generated by the piezoelectric film 14 in the electronic device according to the comparative example. The vertical axis represents the charge amount. The horizontal axis indicates the position. In the position, a forward direction as viewed from the position P0 is a positive direction, and a backward direction as viewed from the position P0 is a negative direction. Note that FIGS. 4 to 6 are results of computer simulation.

First, the electronic device according to the comparative example and the electronic device 1 will be described. In the electronic device according to the comparative example, a Young's modulus of a bonding member 17 is larger than 10 MPa. The Young's modulus of the bonding member 17 of the electronic device according to the comparative example is 100 MPa. On the other hand, in the electronic device 1, the Young's modulus of the bonding member 17 is 0 MPa to 10 MPa. The Young's modulus of the bonding member 17 of the electronic device 1 is 10 MPa.

Next, problems of the electronic device according to the comparative example will be described. In the electronic device according to the comparative example, it is difficult to accurately detect a magnitude of a force by which the user presses an operation panel 2. When the user presses directly above the sensor 6 (position P0 in FIG. 1) downward, the position P0 of the operation panel 2 is deformed downward. At this time, the position P0 of the operation panel 2 extends in the front-back direction and the left-right direction. As illustrated in FIG. 4, a piezoelectric film 14 extends in the front-back direction and the left-right direction.

Here, the piezoelectric film 14 generates a positive charge when stretched in the left-right direction, for example. The piezoelectric film 14 generates a negative charge when stretched in the front-back direction, for example. Therefore, when the position P0 of the operation panel 2 is pressed downward, a charge generated by stretching the piezoelectric film 14 in the left-right direction and a charge generated by stretching the piezoelectric film 14 in the front-back direction cancel each other out. Therefore, the piezoelectric film 14 hardly generates a large charge.

On the other hand, when the user presses a position displaced forward or backward from directly above the sensor 6 (position P1 or P2 in FIG. 1) downward, the position P1 or the position P2 of the operation panel 2 is deformed downward. At this time, the position P0 of the operation panel 2 greatly extends in the left-right direction and does not greatly extend in the front-back direction. Therefore, as illustrated in FIG. 5, the piezoelectric film 14 largely extends in the left-right direction and does not largely extend in the front-back direction. In this case, a charge generated by stretching the piezoelectric film 14 in the left-right direction and a charge generated by stretching the piezoelectric film 14 in the front-back direction are unlikely to cancel each other out. Therefore, the piezoelectric film 14 easily generates a large charge.

As described above, as illustrated in FIG. 6, an amount of charge generated by the piezoelectric film 14 when the position P0 is pressed is smaller than an amount of charge generated by the piezoelectric film when the position P1 or P2 is pressed. Accordingly, in the electronic device according to the comparative example, it is difficult to accurately detect the magnitude of the force by which the user presses the operation panel 2.

Therefore, as a result of the study, the inventors of the present application considered that the bonding member 17 might be softened. In order to confirm this study result, the inventors of the present application conducted the following computer simulation.

Figure 7:
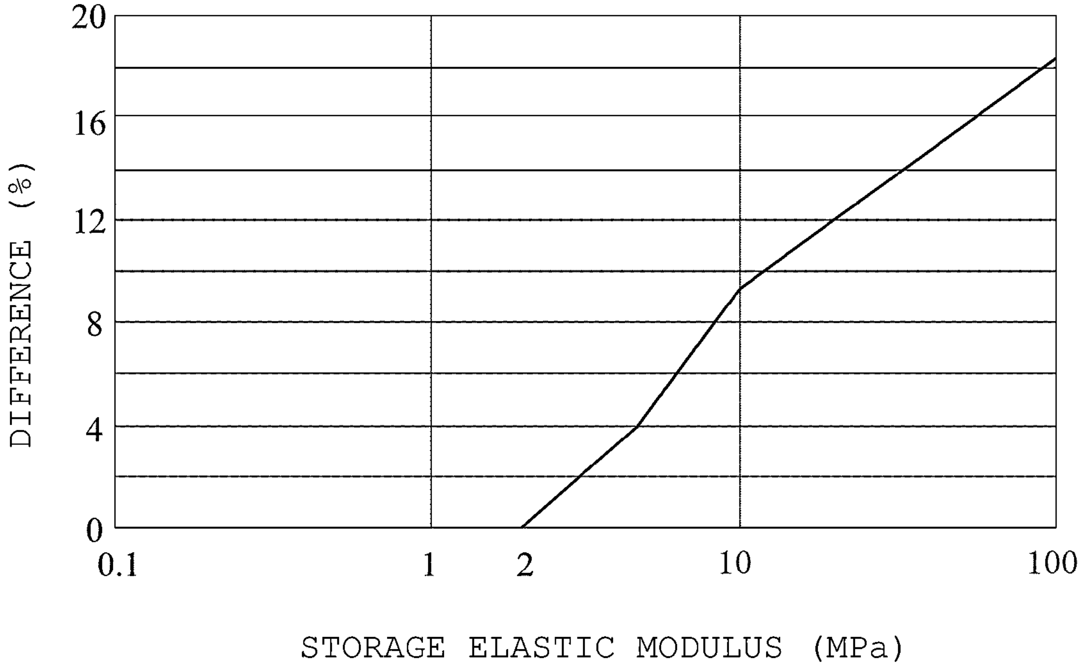
FIG. 7 is a graph illustrating a relationship between Young's modulus and a difference.
Figure 8:
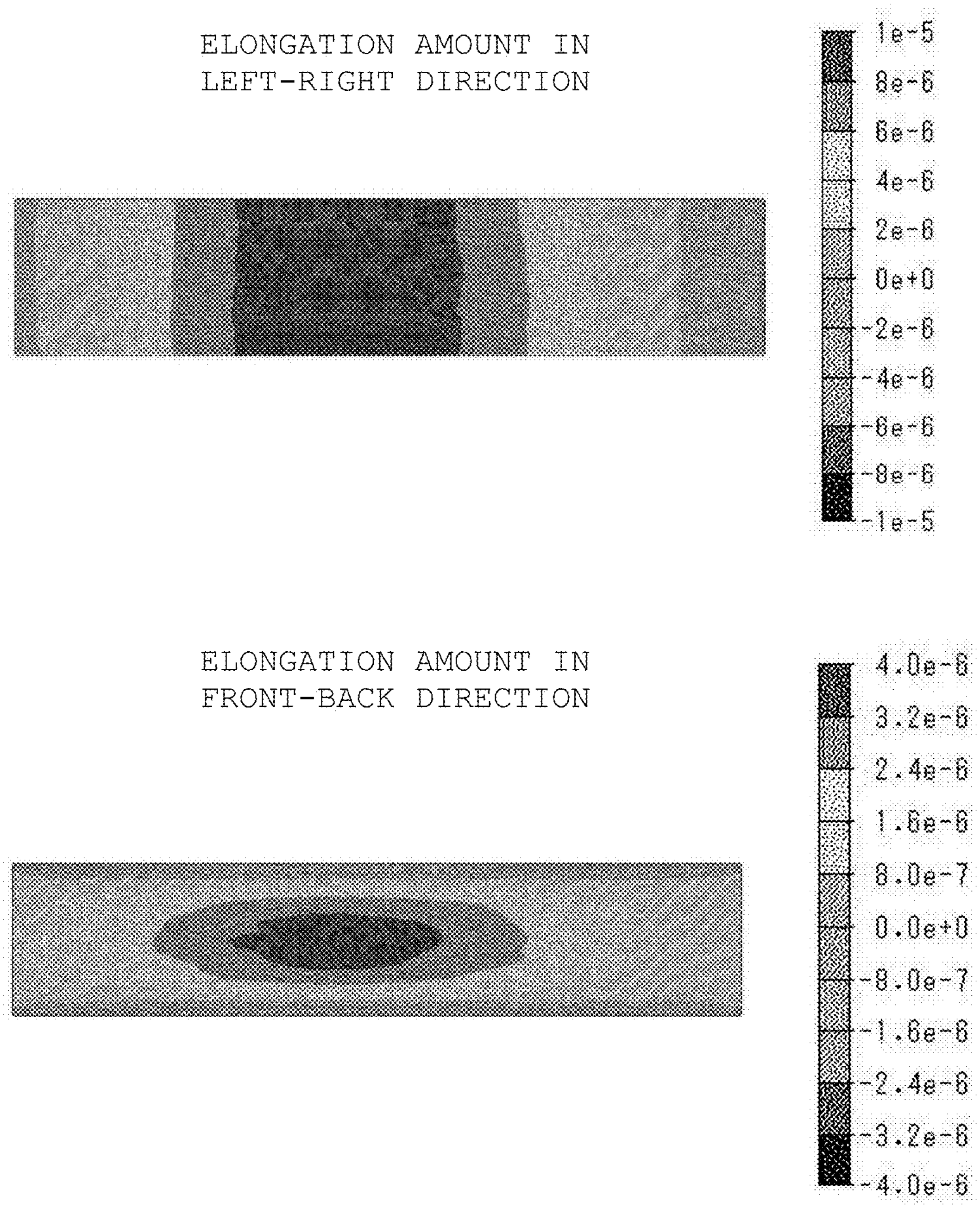
FIG. 8 is a diagram illustrating an elongation amount in the left-right direction and an elongation amount in the front-back direction of the piezoelectric film 14.
Figure 9:
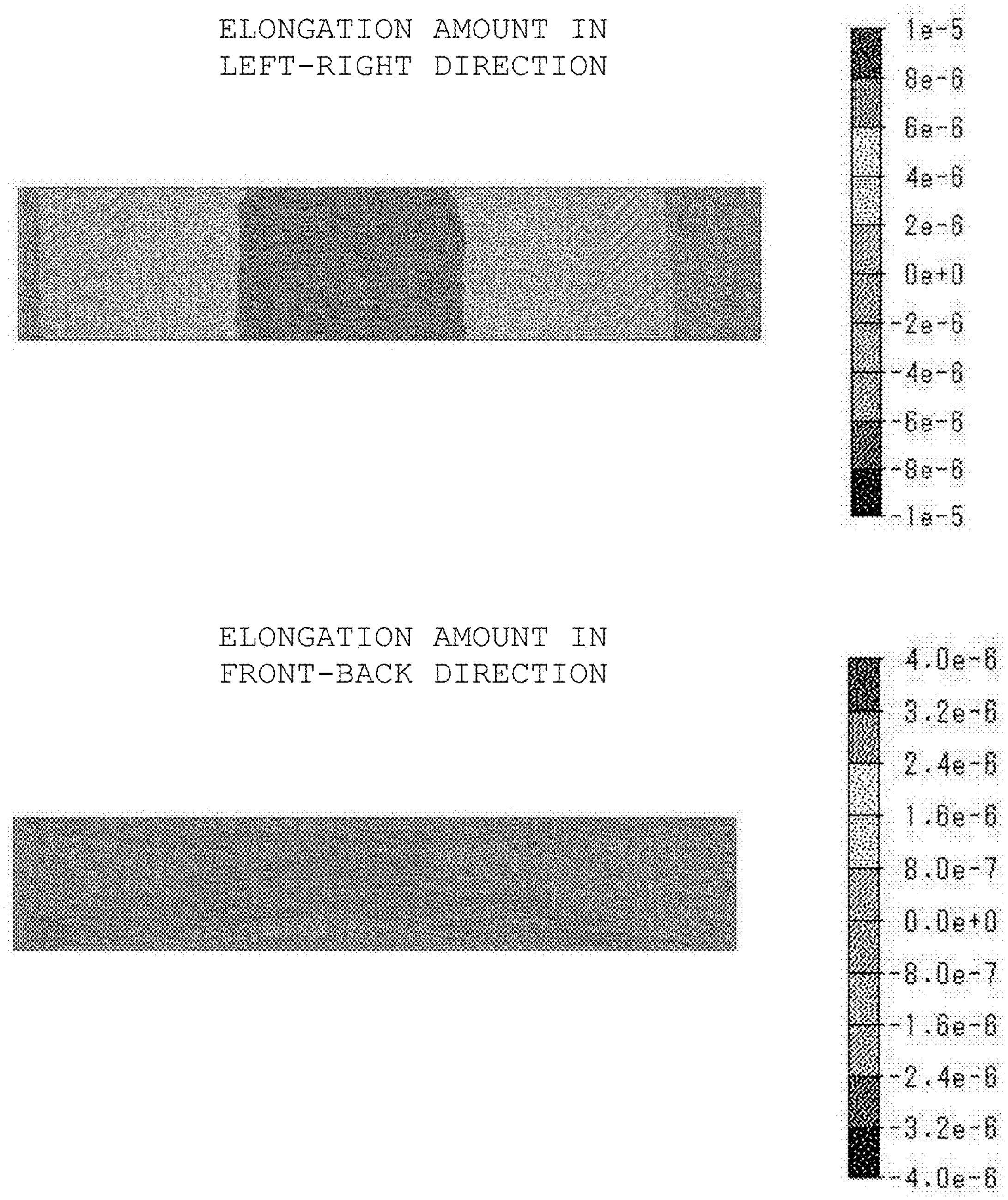
FIG. 9 is a diagram illustrating an elongation amount in the left-right direction and an elongation amount in the front-back direction of the piezoelectric film 14.

The inventors of the present application calculated a difference (%) when the Young's modulus of the bonding member 17 was changed. The difference is a value obtained by multiplying by 100 a value obtained by dividing a difference between the charge amount when the position P1 is pressed and the charge amount when the position P0 is pressed in FIG. 6 by the charge amount when the position P0 is pressed. FIG. 7 is a graph illustrating a relationship between Young's modulus and the difference. The vertical axis indicates the difference. The horizontal axis represents Young's modulus. FIGS. 8 and 9 are diagrams illustrating an elongation amount in the left-right direction and an elongation amount in the front-back direction of the piezoelectric film 14. In FIG. 8, the user presses the position P0 in FIG. 1 downward. In FIG. 9, the user presses the position P1 or the position P2 in FIG. 1 downward.

The difference may be 10% or less. Therefore, according to FIG. 7, it is understood that the Young's modulus of the bonding member 17 may be 0 MPa to 10 MPa. Furthermore, when the Young's modulus is 0 MPa to 2 MPa, the difference is 0%. Then, as illustrated in FIG. 8, it can be understood that when the Young's modulus of the bonding member 17 is 10 MPa, the amount of elongation of the piezoelectric film 14 in the front-back direction is reduced. On the other hand, as illustrated in FIG. 9, it can be understood that if the Young's modulus of the bonding member 17 is 10 MPa, the amount of elongation of the piezoelectric film 14 in the left-right direction is sufficiently large. As described above, when the bonding member 17 is made soft, the piezoelectric film 14 can generate sufficient electric charges if the position P0 is pressed. As a result, according to the sensor 6, the magnitude of the force by which the user presses the operation panel 2 can be detected with high accuracy.

Here, the inventors of the present application has considered the following reason why the magnitude of the force by which the user presses the operation panel 2 can be accurately detected in the sensor 6. In the electronic device according to the comparative example, when the piezoelectric film 14 is pulled in the left-right direction, the piezoelectric film 14 tends to contract in the up-down direction. However, when the Young's modulus of the bonding member 17 is high, deformation of the piezoelectric film 14 is inhibited by the plate-shaped member 7. As a result, the piezoelectric film 14 cannot contract in the up-down direction and is stretched in the up-down direction together with the plate-shaped member 7. As a result, in the electronic device according to the comparative example, the amount of charge generated by the piezoelectric film 14 was reduced.

On the other hand, when the Young's modulus of the bonding member 17 is lowered as in the sensor 6, the deformation of the piezoelectric film 14 is hardly inhibited by the plate-shaped member 7. Therefore, the piezoelectric film 14 can contract in the up-down direction. As a result, the amount of charge generated by the piezoelectric film 14 increases. As a result, the difference in FIG. 6 decreases. As described above, the sensor 6 can accurately detect the magnitude of the force by which the user presses the operation panel 2.

Modification

Figure 10:
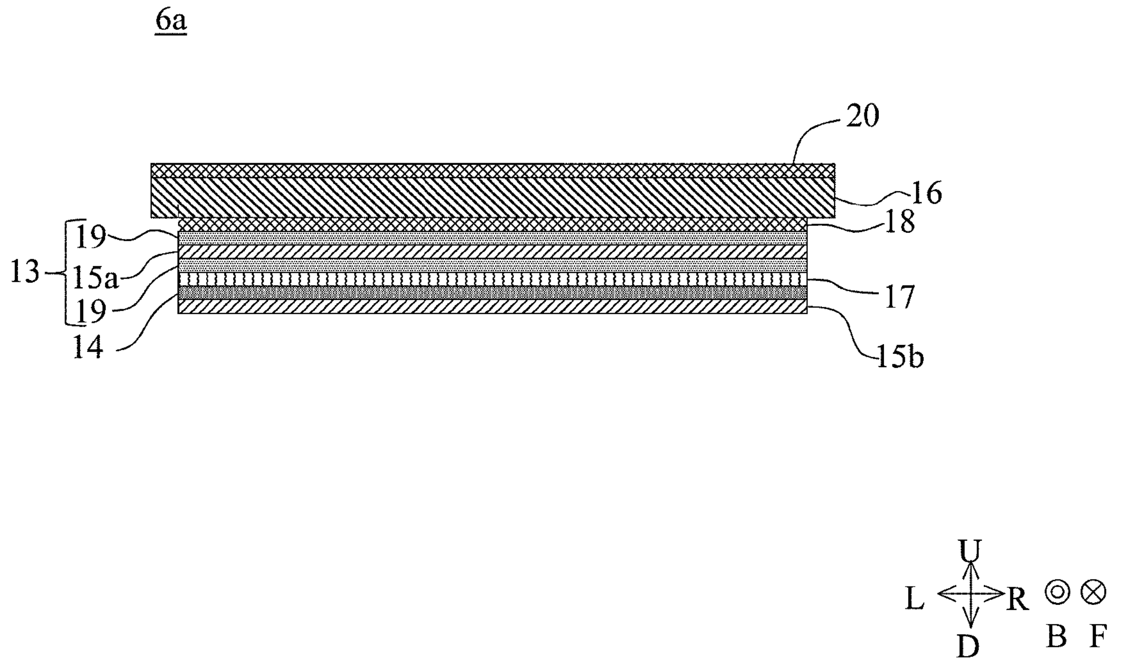
FIG. 10 is a sectional view of the sensor 6*a*.

Hereinafter, a sensor 6*a* according to a modification will be described. FIG. 10 is a sectional view of the sensor 6*a*.

The sensor 6*a* is different from the sensor 6 in the position of an upper electrode 15*a*. More specifically, the upper electrode 15*a* is provided between an upper principal surface and a lower principal surface of a flexible printed circuit board 19. That is, the upper electrode 15*a* is located in the flexible printed circuit board 19. Then, a bonding member 17 fixes the flexible printed circuit board 19 to an upper principal surface of a piezoelectric film 14. Other structures of the sensor 6*a* are the same as those of the sensor 6, and thus description thereof is omitted. Furthermore, the sensor 6*a* can achieve the same operation and effect as the sensor 6.

Other Embodiments

A sensor according to the present disclosure is not limited to the sensors 6 and 6*a*, and can be changed within the scope of the gist thereof.

Note that, in the electronic device 1, the piezoelectric film 14 may be a polyvinylidene fluoride (PVDF) film. Furthermore, the piezoelectric film 14 may be piezoelectric ceramic. Furthermore, the piezoelectric film 14 may be a strain sensor.

Note that, in the sensors 6 and 6*a*, the flexible printed circuit board 19 is not an essential component.

Note that the bonding member 5 may not have waterproofness.

Note that two sides extending in the front-back direction may be short sides, and two sides extending in the left-right direction may be long sides.

Note that the sensor 6 may be provided at a position other than the center in the front-back direction of the plate-shaped member 7 when viewed in the up-down direction.

Note that the operation panel 2 may be a resin plate.

Note that the sensor 6 may not have a longitudinal direction extending in the left-right direction. The sensor 6 may have a longitudinal direction extending in the front-back direction.

Note that the electronic device 1 includes the touch panel, but may be a touch pad. In this case, the display panel 4 is unnecessary. Furthermore, the operation panel 2 may not be a transparent member.

DESCRIPTION OF REFERENCE SYMBOLS

1: Electronic device
2: Operation panel
3: Housing

4: Display panel
5: Bonding member
6, 6*a*: Sensor
7: Plate-shaped member
13: Electrode member
14: Piezoelectric film
15*a*: Upper electrode
15*b*: Lower electrode
16: Substrate
17: Bonding member
18, 20: Bonding layer
19: Flexible printed circuit board

The invention claimed is:

1. A sensor comprising:
a piezoelectric film including an upper principal surface and a lower principal surface aligned in an up-down direction;
a lower electrode on the lower principal surface of the piezoelectric film;
an electrode member including an upper electrode;
a bonding member that fixes the electrode member to the upper principal surface of the piezoelectric film;
a substrate disposed above the electrode member and having an upper surface and a lower surface;
a first bonding layer fixing the electrode member to the lower surface of the substrate; and
a second bonding layer adjacent the upper surface of the substrate such that the first bonding layer and the second bonding layer sandwich the substrate therebetween,
wherein the bonding member has a Young's modulus of 2 MPa to 10 MPa.

2. The sensor according to claim 1, wherein the electrode member further includes a flexible printed circuit board.

3. The sensor according to claim 2, wherein
the flexible printed circuit board includes an upper principal surface and a lower principal surface aligned in the up-down direction,
the upper electrode is on the lower principal surface of the flexible printed circuit board, and
the bonding member fixes the upper electrode to the upper principal surface of the piezoelectric film.

4. The sensor according to claim 2, wherein
the flexible printed circuit board includes an upper principal surface and a lower principal surface aligned in the up-down direction,
the upper electrode is between the upper principal surface and the lower principal surface of the flexible printed circuit board, and
the bonding member fixes the flexible printed circuit board to the upper principal surface of the piezoelectric film.

5. The sensor according to claim 1, wherein a polarity of a charge generated by the piezoelectric film when the piezoelectric film is stretched in a left-right direction is different from a polarity of a charge generated by the piezoelectric film when the piezoelectric film is stretched in a front-back direction.

6. The sensor according to claim 1, wherein the piezoelectric film comprises polylactic acid.

7. An electronic device comprising:
an operation panel; and
the sensor according to claim 1 fixed to the operation panel so as to detect deformation of the operation panel.

8. The electronic device according to claim 7, further comprising a display panel between the operation panel and the sensor.

9. The electronic device according to claim 8, further comprising a plate-shaped member between the display panel and the sensor.

10. The electronic device according to claim 7, wherein the sensor is located at a center of the operation panel.

* * * * *